(12) United States Patent
Chung et al.

(10) Patent No.: US 7,296,110 B2
(45) Date of Patent: Nov. 13, 2007

(54) MEMORY SYSTEM AND DATA CHANNEL INITIALIZATION METHOD FOR MEMORY SYSTEM

(75) Inventors: Hoe-ju Chung, Yongin-si (KR); Jung-bae Lee, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 327 days.

(21) Appl. No.: 11/071,586

(22) Filed: Mar. 4, 2005

(65) Prior Publication Data

US 2005/0240718 A1      Oct. 27, 2005

(30) Foreign Application Priority Data

Mar. 4, 2004    (KR) .................... 10-2004-0014586

(51) Int. Cl.
*G06F 12/00* (2006.01)

(52) U.S. Cl. .................... 711/5; 711/105; 711/154; 711/167; 711/170; 365/233

(58) Field of Classification Search .......... 711/5, 711/105, 154, 167, 170; 365/233
See application file for complete search history.

(56) References Cited

U.S. PATENT DOCUMENTS

| | | | | |
|---|---|---|---|---|
| 6,137,734 | A | * | 10/2000 | Schoner et al. ............. 365/194 |
| 6,272,070 | B1 | * | 8/2001 | Keeth et al. ............. 365/233.5 |
| 6,442,644 | B1 | * | 8/2002 | Gustavson et al. ......... 711/105 |
| 6,445,643 | B2 | * | 9/2002 | Keeth et al. ................ 365/233 |
| 6,553,472 | B2 | | 4/2003 | Yang et al. |
| 2003/0026162 | A1 | | 2/2003 | Matsui |

* cited by examiner

*Primary Examiner*—Stephen C. Elmore
(74) *Attorney, Agent, or Firm*—Volentine & Whitt, PLLC

(57) ABSTRACT

Provided is a memory system and a method that can initialize a data channel at a high speed without the need to increase the number of pins in a semiconductor memory device, and not requiring a circuit to perform an initialization. The memory system includes a memory module equipped with a plurality of semiconductor memory devices; a memory controller controlling the semiconductor memory devices; and a data channel and a command/address channel connected between the plurality of semiconductor memory devices and the memory controller, wherein read latencies and write latencies of the plurality of semiconductor memory devices are controlled by the memory controller.

11 Claims, 5 Drawing Sheets

MEMORY SYSTEM AND DATA CHANNEL INITIALIZATION METHOD FOR MEMORY SYSTEM

BACKGROUND OF THE INVENTION

1. Field of the Invention

The present invention relates to a memory system and a data channel initialization method for the memory system.

A claim of priority is made to Korean Patent Application No. 2004-14586, filed on Mar. 4, 2004, the disclosure of which is incorporated herein in its entirety by reference.

2. Description of the Related Art

As the operational speed of semiconductor memory devices has increased, data channel initialization has become vital for stable communication between a memory controller and a memory device. A conventional memory system is disclosed, for example, in U.S. Patent Application No. U.S. 2003/0026162A1.

In order to initialize a data channel, the conventional semiconductor memory device is equipped with extra pins, and a channel delay is adjusted by repeating data write and data read operations in the semiconductor memory device. However, the disadvantage of this system is the increased number of pins, and the requirement of an additional circuit to perform initialization.

SUMMARY OF THE INVENTION

The present invention provides a memory system capable of initializing a data channel at high speed without increasing pin count for an associated semiconductor memory device and without using an additional circuit performing initialization.

According to an aspect of the present invention, there is provided a memory system comprising a memory module having a plurality of semiconductor memory devices, a memory controller to control the semiconductor memory devices; and a data channel and a command/address channel connected between the semiconductor memory devices and the memory controller, wherein read latencies and write latencies of the plurality semiconductor memory devices are controlled by the memory controller.

According to another aspect of the present invention, there is provided a data channel initialization method for a memory system comprising initializing a plurality of semiconductor memory devices by applying a write command from a memory controller to the plurality of semiconductor memory devices and writing a low frequency data bit pattern from the memory controller to the plurality of semiconductor memory devices.

The method is provided by applying a read command from the memory controller to the plurality of semiconductor memory devices and reading the written data bit pattern from the plurality of semiconductor memory devices, checking delay times of a period defined from a time when the read command is output by the memory controller to a time when first valid data from the data bit patterns read from each of the plurality of he semiconductor memory devices arrives at the memory controller, determining read latencies for the plurality of semiconductor memory devices according to a checking result such that a longest one of the delay times becomes identical with other delay times, and providing the read latencies to the plurality of semiconductor memory devices.

The method is further provided by comparing a first data bit pattern of the low frequency data bit pattern written in the plurality of semiconductor memory devices with first data bit patterns of the data bit patterns read from the plurality of semiconductor memory devices, and determining write latencies for the plurality of semiconductor memory devices according to a comparison result such that the first data bit pattern of the written low frequency data bit pattern becomes identical with the first data bit patterns of the data bit patterns read from the plurality of semiconductor memory devices, and providing the write latencies to the semiconductor memory devices.

BRIEF DESCRIPTION OF THE DRAWINGS

Aspects of the present invention will become more apparent by the description of exemplary embodiments with reference to the attached drawings in which.

DETAILED DESCRIPTION OF THE INVENTION

Figure 1:
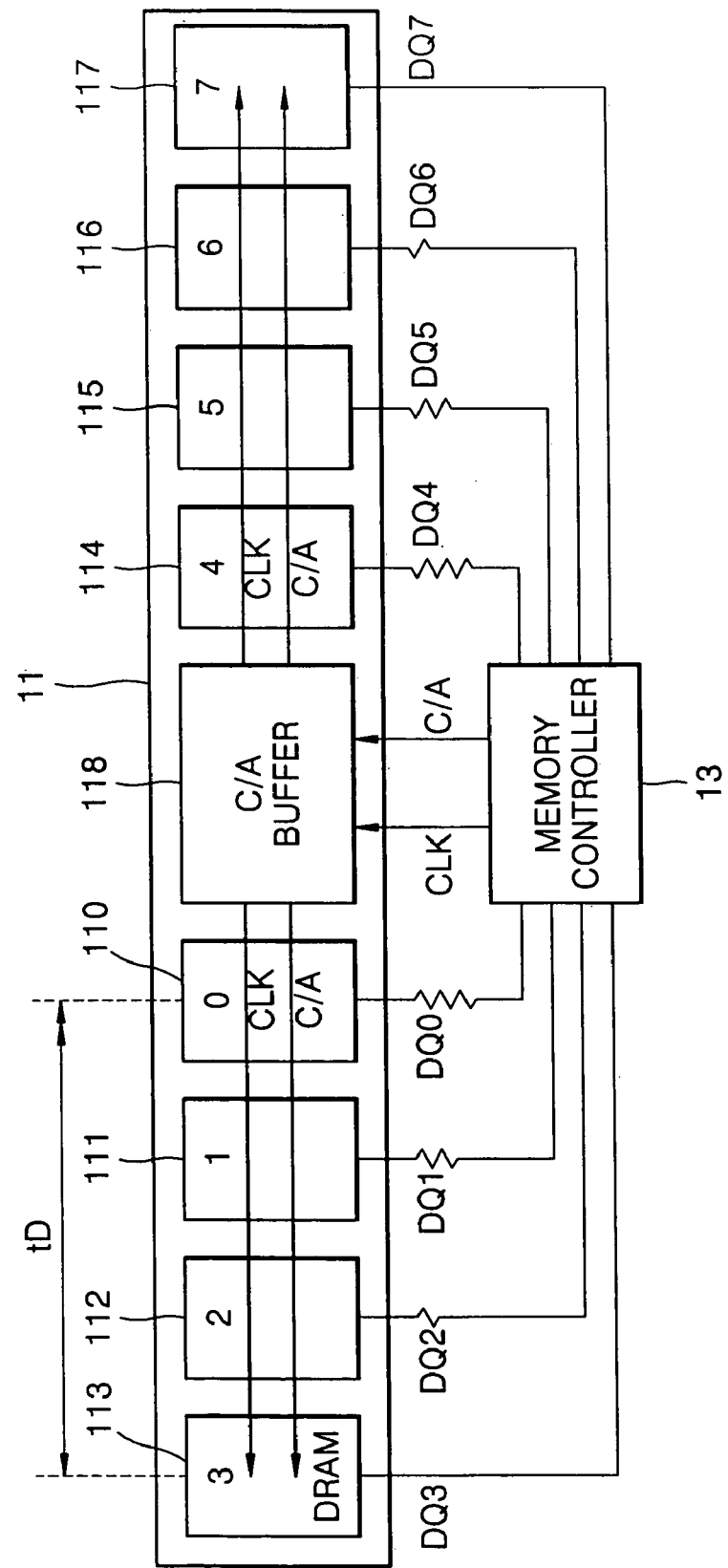
FIG. 1 is a schematic diagram illustrating a memory system according to an embodiment of the present invention.

The attached drawings illustrate preferred embodiments of the present invention and are presented to allow those of ordinary skill in the art to gain a sufficient understanding of the present invention.

Throughout the drawings, like reference numerals in the drawings denote like elements.

Referring to FIG. 1, a memory system includes: a plurality of DRAMs 110 through 117; a memory module 11 equipped with a column/address buffer 118; a memory controller 13 to control DRAMs 110 through 117 and column/address buffer 118; data channels DQ0 through DQ7 connected between DRAMs 110 through 117 and memory controller 13; and a command/address channel C/A.

In particular, memory controller 13 controls read latencies for DRAMs 110 through 117 and write latencies for DRAMs 110 through 117.

Accordingly, each of DRAMs 110 through 117 has a predetermined output delay time based on a corresponding read latency, and outputs data to data channels DQ0 through DQ7. Each of DRAMs 110 through 117 also has a predetermined input delay time based on a corresponding write latency, and inputs data from the data channel DQ0 through DQ7.

Hereinafter, referring to FIGS. 2 through 5, a data channel initialization method according to an embodiment of the present invention will be described.

Figure 2:
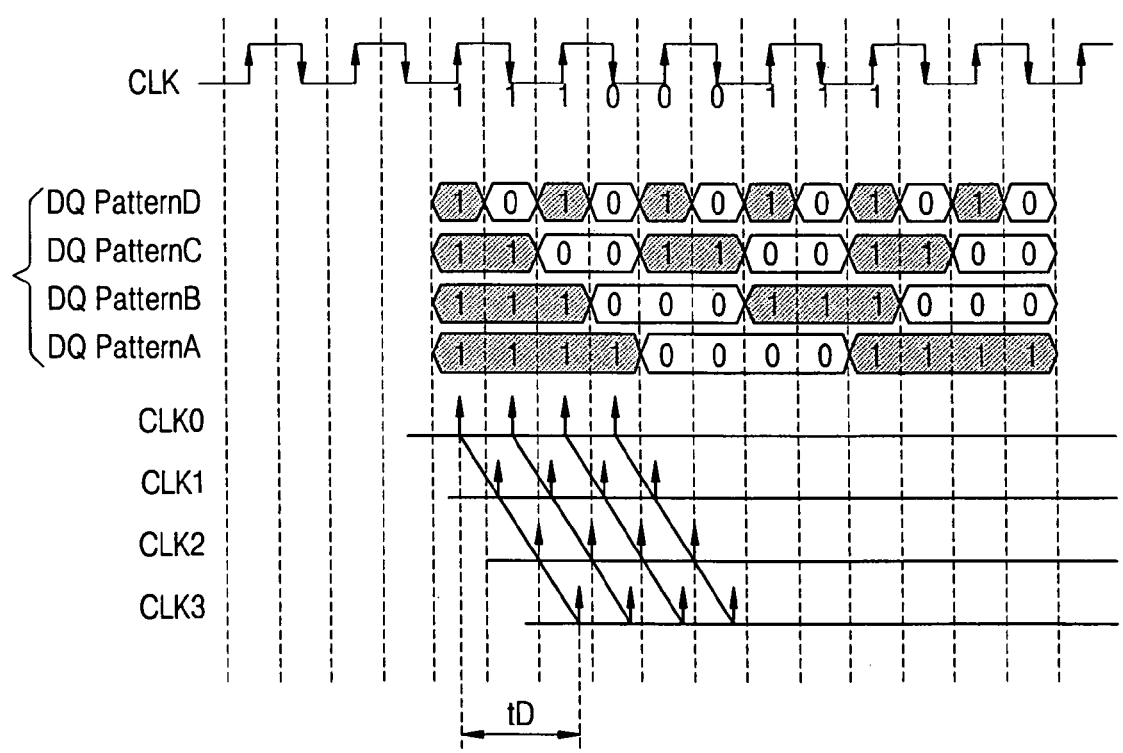
FIG. 2 is a timing diagram illustrating a write data bit pattern in a data channel initialization method according to an embodiment of the present invention.
Figure 3:
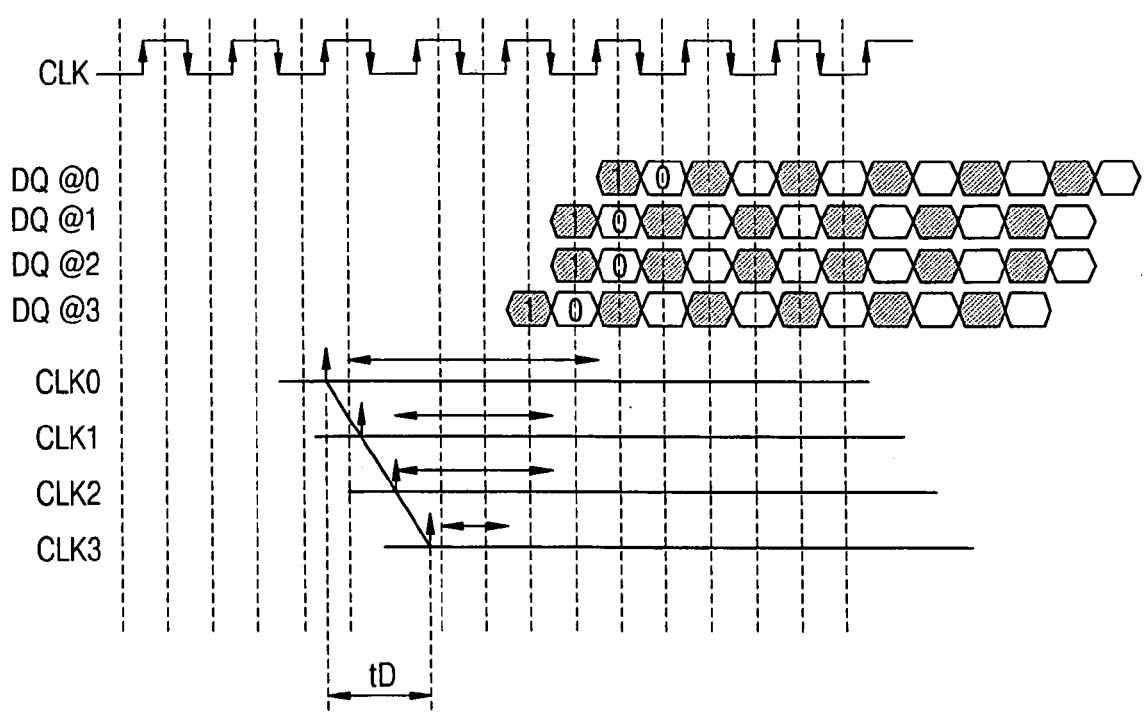
FIG. 3 is a timing diagram illustrating a read data bit pattern in a data channel initialization method according to an embodiment of the present invention.

FIG. 2 is a timing diagram illustrating a write data bit pattern adapted for use in a data channel initialization method according to an embodiment of the present invention. FIG. 3 is a timing diagram illustrating a read data bit pattern adapted for use in a data channel initialization method according to an embodiment of the present invention.

First, during a read operation, a low frequency write data bit pattern DQ Pattern A having a form of 111100001111 ... is simultaneously transmitted and written to DRAMs 110 through 117 from memory controller 13 via data channel DQ0 through DQ3. In this case, depending on the position of DRAMs 110 through 113, different data values are written in DRAMs 110 through 113.

In DRAM0 110, a write data bit pattern is written in response with CLK0; in DRAM1 111, a write data bit pattern is written in response with CLK1; in DRAM2 112, a write data bit pattern is written in response with CLK2; and in DRAM3 113, a write data bit pattern is written in response with CLK3. Here, CLK0 indicates a clock signal CLK arriving at DRAM0 110; CLK1 indicates a clock signal CLK arriving at DRAM1 111; CLK2 indicates a clock signal CLK arriving at DRAM2 112; and CLK3 indicates a clock signal CLK arriving at DRAM3 113.

Next, in order to estimate the positions of DRAMs 110 through 113, data bit patterns written in DRAMs 110 through 113 are read again from DRAMs 110 through 113. When the read data bit pattern is different from the written data bit pattern, a write latency is controlled in memory controller 13 such that the read data bit pattern is identical with the written data bit pattern, and the controlled written latency is provided to DRAMs 110 through 113.

A write data bit pattern is transformed into a write data bit pattern DQ Pattern B having a form of 111000111 ..., and the write operations and read operations, described above, are repeated. When the write operations and the read operations are repeated until the write data bit pattern is identical with a bit time, i.e., during a half cycle of clock signal CLK, that is to say, until the write data bit pattern becomes a write data bit pattern DQ Pattern D, a time difference tD between a time when the write data bit pattern DQ Pattern arrives at DRAM3 113 and a time when command/address C/A arrives at DRAM3 113 is compensated by the bit time.

As described above, time difference tD is roughly compensated by the bit time, and then, a time sampling point is finely compensated, thereby transferring a sampling point location to the center of data.

Figure 4:
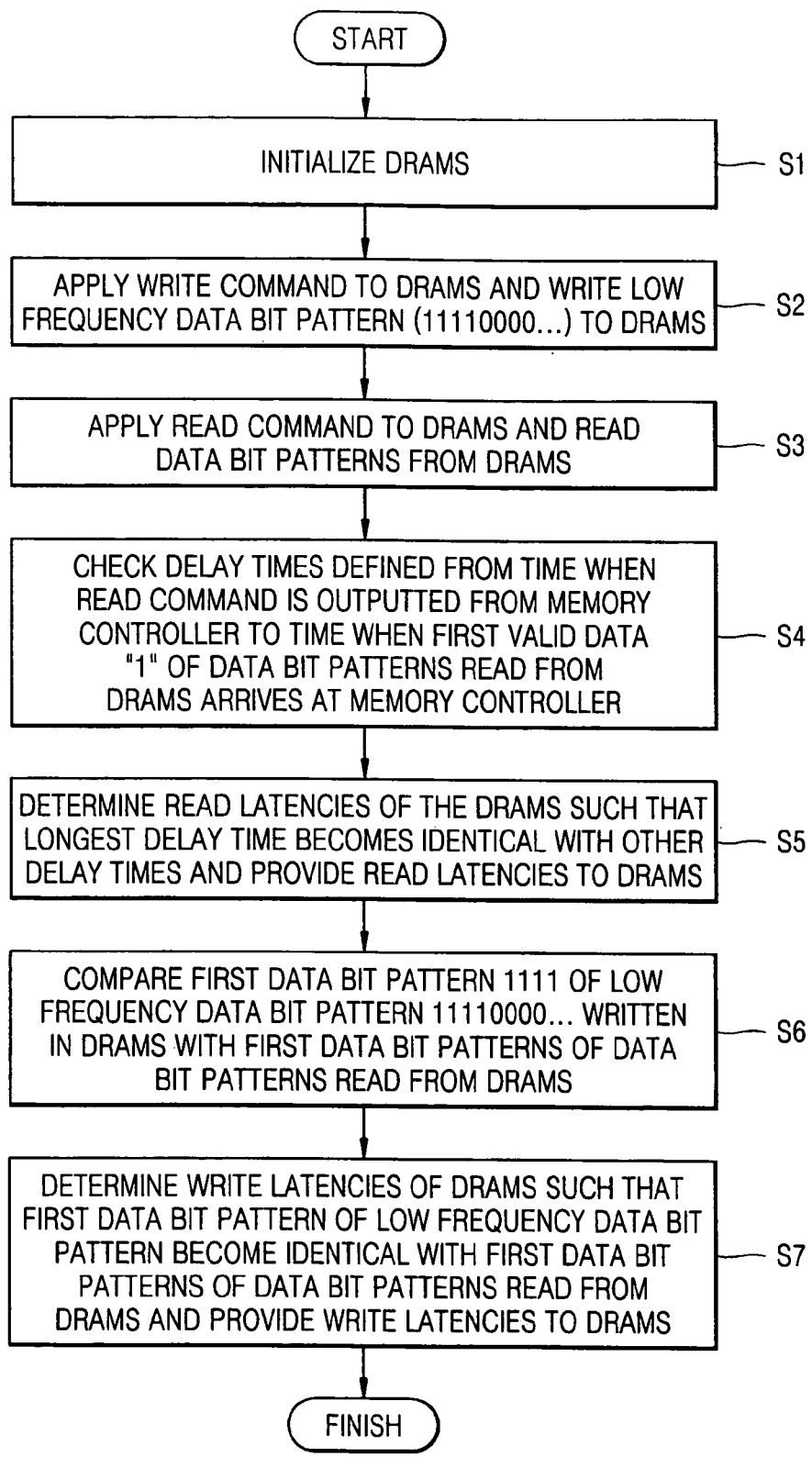
FIG. 4 is a flow chart illustrating a data channel initialization method according to an embodiment of the present invention.
Figure 5:
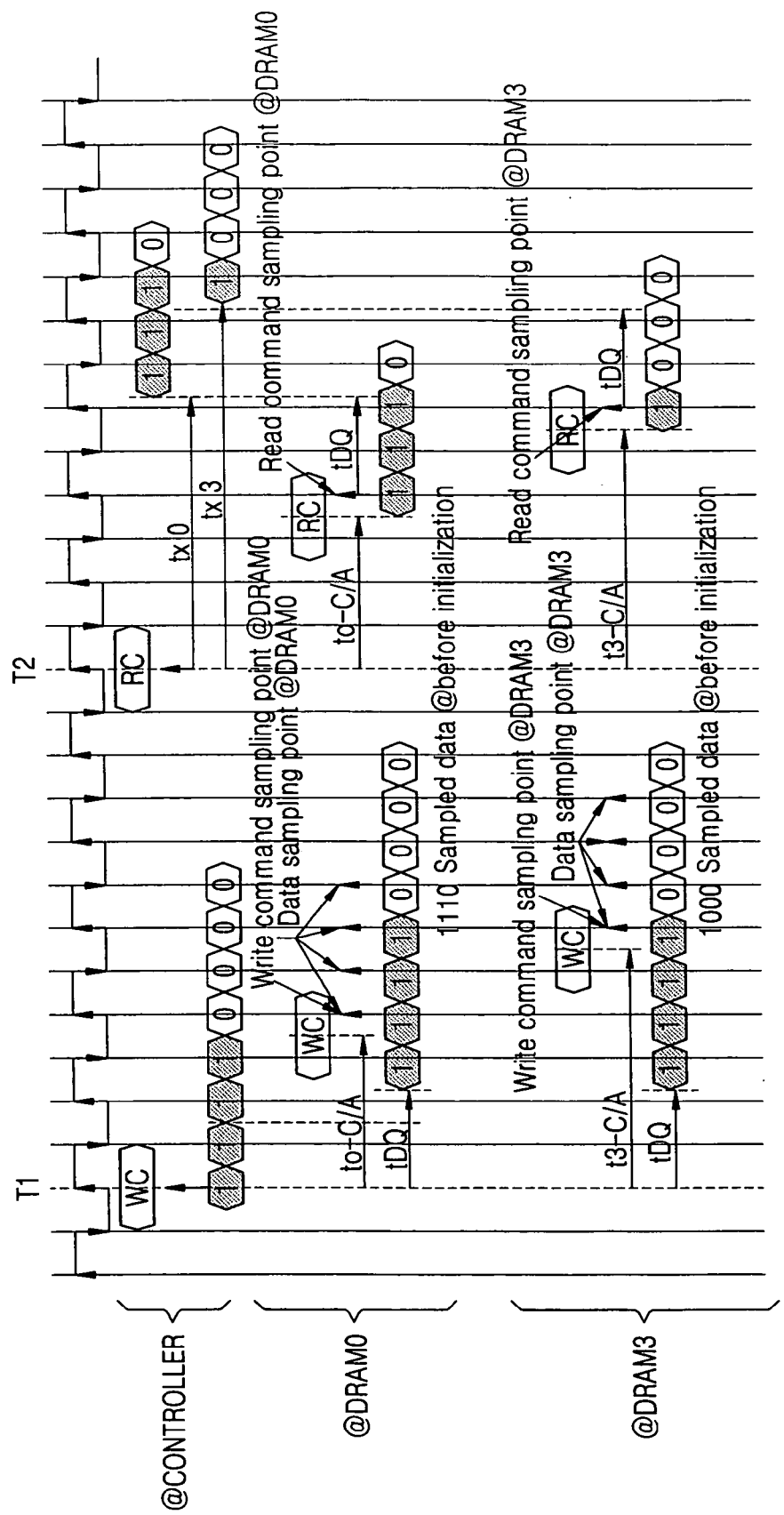
FIG. 5 is an operational timing diagram of a data channel initialization method according to an embodiment of the present invention.

FIG. 4 is a flow chart illustrating a data channel initialization method according to an embodiment of the present invention. FIG. 5 is an operational timing diagram of a data channel initialization method according to an embodiment of the present invention. For explanation purposes, only timing diagrams for memory controller 13, DRAM0 110, and DRAM3 113 are illustrated in FIG. 5.

First, DRAMs 110 through 113 are initialized (S1). Namely, DRAMs 110 through 113 are powered-up; a Mode Register Set (MRS) is set; and a Burst Length (BL) and a CAS latency are set.

Next, a write command WC is applied to DRAMs 110 through 113 by memory controller 13 via command/address channel C/A, and the same low frequency data bit patterns 11110000 ... are simultaneously transmitted and written to DRAMs 110 through 113 from memory controller 13 via data channels DQ0 through DQ3 (S2).

Referring to FIG. 5, when write command WC and data bit pattern 11110000 ... are output from memory controller 13 at a time T1, write command WC arrives at DRAM0 110 via command/address channel C/A after a delay time t0-C/A, and arrives at DRAM3 after a delay time t3-C/A; and data bit pattern 11110000 ... arrives at DRAM0 110 and DRAM3 113 via channel DQ0 through DQ3 after the same delay time tDQ. Accordingly, before the data channel initialization, data 1110 is sampled and stored in DRAM0 110, and data 1000 is sampled and stored in DRAM3 113.

Next, a read command RC is applied to DRAMs 110 through 113 by memory controller 13 via command/address channel C/A, and data bit pattern is read again from DRAMs 110 through 113 via data channels DQ0 through DQ3 (S3).

Referring to FIG. 5, when read command RC is output from memory controller 13 at a time T2, read command RC arrives at DRAM0 110 via command/address channel C/A after delay time t0-C/A, and arrives at DRAM3 113 after t3-C/A. Accordingly, data 1110 stored in DRAM0 110 is output, and data 1000 stored in DRAM3 113 is output. For convenience, it is assumed that when read command RC is applied to DRAMs, data is instantly output.

Data bit pattern 1110 read from DRAM0 110 and data bit pattern 1000 read from DRAM3 113 arrive at memory controller 13 via data channel DQ0 through DQ3 after the same delay time tDQ.

Next, delay times tx0 and tx3 are checked by memory controller 13. Delay times tx0 and tx3 are defined from point in time T2 when read command RC is output from memory controller 13 to a time when first valid data "1" of the data bit patterns read from DRAMs 110 through 113 arrives at memory controller 13 (S4).

Next, based on the result of the check, in order to synchronize the longest delay time tx3 with the delay time tx0, memory controller 13 determines the read latency of DRAMs 110 through 113, and provides the read latencies of DRAMs 110 through 113 to DRAMs 110 through 113 (S5).

Accordingly, each of DRAMs 110 through 113 outputs data, having an output delay time different from each other based on their respective read latencies, which are determined differently from each other. Finally, delay times tx0 and tx3 become identical with each other.

Next, a first bit pattern 1111 of low frequency data bit pattern 11110000 ... written in DRAMs 110 through 113 is compared with first bit patterns of the data bit patterns read from DRAMs 110 through 113 by memory controller 13 (S6).

Based on the result of the comparison, to synchronize first data bit pattern 1111 of the low frequency data bit pattern with the first data bit patterns of the data bit patterns read from DRAMs 110 through 113, memory controller 13 determines a write latency of DRAMs 110 through 113 and provides the write latency to DRAMs 110 through 113 (S7).

Accordingly, each of DRAMs 110 through 113 inputs write data, having an input delay time different from each other according to the respective write latencies differently determined from each other. As a result, first data bit pattern 1111 of the low frequency data bit pattern is identical with the first data bit patterns of the data bit patterns read from DRAMs 110 through 113.

As described above, in the memory system according to an embodiment of the present invention, a time difference tD between a time when write data bit pattern DQ Pattern arrives at DRAMs and a time when a command/address C/A arrives at the DRAMs is compensated. In other words, write data bit pattern DQ Pattern is sequentially changed, and a data channel is initialized. Accordingly, additional pins for an associated semiconductor memory device are not required, and an additional circuit to perform initialization is also not required.

While the present invention has been shown and described with reference to exemplary embodiments thereof, it will be understood by those of ordinary skill in the art that various changes in form and details may be made therein without departing from the scope of the present invention as defined by the following claims.

What is claimed is:

1. A memory system, comprising:
a memory module having a plurality of semiconductor memory devices;
a data channel and a command/address channel connected between the plurality of semiconductor memory devices and a memory controller, wherein the memory controller is configured to:
write a data bit pattern to the plurality of semiconductor memory devices;
read a data bit pattern written to the plurality of memory devices;
compare the read data bit pattern with the written data bit pattern; and
based on the comparison, control a write latency for each of the plurality of semiconductor memory devices such that the read data bit pattern is identical with the written data pattern.

2. The memory system of claim 1, wherein each of the plurality of semiconductor memory devices inputs data having a predetermined input delay time according to a corresponding write latency.

3. The memory system of claim 1, wherein the memory controller is further configured to:
measure a delay time, the delay time being a time from when a read command is output from the memory controller to respective semiconductor memory devices to a time when a first valid data of the read data bit pattern is read from the respective semiconductor memory devices by the memory controller;
based on the measured delay time, calculate a read latency for each of the plurality of semiconductor memory devices so as to synchronize a longest delay time between the memory controller and the respective semiconductor memory devices with other delay times.

4. The memory system of claim 3, wherein each of the plurality of semiconductor memory devices outputs data having a predetermined output delay time according to a corresponding read latency.

5. A data channel initialization method for a memory system, comprising:
initializing a plurality of semiconductor memory devices;
applying a write command from a memory controller to the plurality of semiconductor memory devices and writing a data bit pattern from the memory controller to the plurality of semiconductor memory devices;
applying a read command from the memory controller to the plurality of semiconductor memory devices and reading the written data bit pattern from the plurality of semiconductor memory devices;
checking delay times as determined by a period defined from a time when the read command is output from the memory controller to a time when first valid data from the data bit patterns read from each of the plurality of semiconductor memory devices arrives at the memory controller; and
determining respective read latencies for the plurality of semiconductor memory devices according to checked delay times and providing the read latencies to the plurality of semiconductor memory devices, such that the plurality of semiconductor devices output data having an output delay time based on the respective read latencies such that a longest delay time is synchronized with other delay times.

6. The method of claim 5, further comprising:
comparing a first data bit pattern from the data bit pattern written to the plurality of semiconductor memory devices with first data bit patterns read from the plurality of semiconductor memory devices; and
determining respective write latencies for the plurality of semiconductor memory devices according to a comparison result, providing the write latencies to the semiconductor memory devices, and writing data using an input delay time based on the respective write latencies such that the first data bit pattern of the written data bit pattern becomes identical with the first data bit patterns read from the plurality of semiconductor memory devices.

7. The method of claim 5, wherein each of the plurality of semiconductor memory devices outputs data having an output delay time, wherein the output delay time of one semiconductor device is different from the output delay time of another semiconductor memory device according to a different read latency provided from the memory controller.

8. The method of claim 5, wherein each of the plurality of semiconductor memory devices input write data having an input delay time, wherein the input delay time of one semiconductor device is different from the input delay time of another semiconductor memory device according to a different write latency provided from the memory controller.

9. The method of claim 5, wherein the checking of the delay times is performed by the memory controller.

10. The method of claim 5, wherein the determining of the read latency and the providing of the read latency to the semiconductor memory devices are performed by the memory controller.

11. The method of claim 5, wherein the comparing is performed by the memory controller.

* * * * *